United States Patent
Takayama

(10) Patent No.: US 7,428,837 B2
(45) Date of Patent: Sep. 30, 2008

(54) TANDEM PRESS LINE, OPERATION CONTROL METHOD FOR TANDEM PRESS LINE, AND WORK TRANSPORTATION DEVICE FOR TANDEM PRESS LINE

(75) Inventor: Yukiyoshi Takayama, Komatsu (JP)

(73) Assignee: Komatsu, Ltd., Tokyo (JP)

( * ) Notice: Subject to any disclaimer, the term of this patent is extended or adjusted under 35 U.S.C. 154(b) by 439 days.

(21) Appl. No.: 10/539,346

(22) PCT Filed: Apr. 30, 2004

(86) PCT No.: PCT/JP2004/006277

§ 371 (c)(1),
(2), (4) Date: Jun. 16, 2005

(87) PCT Pub. No.: WO2004/096533

PCT Pub. Date: Nov. 11, 2004

(65) Prior Publication Data

US 2006/0169020 A1    Aug. 3, 2006

(30) Foreign Application Priority Data

May 1, 2003    (JP) .............................. 2003-126504

(51) Int. Cl.
*B30B 15/00*    (2006.01)

(52) U.S. Cl. ..................... 72/20.5; 72/405.01; 72/419; 100/45; 100/207

(58) Field of Classification Search .................. 72/20.5, 72/405.01, 419; 100/45, 207
See application file for complete search history.

(56) References Cited

U.S. PATENT DOCUMENTS

| | | | | | |
|---|---|---|---|---|---|
| 3,948,162 | A | * | 4/1976 | Numba | 100/45 |
| 4,378,592 | A | * | 3/1983 | Heiberger et al. | 700/206 |
| 4,414,887 | A | * | 11/1983 | Orii | 100/45 |
| 5,913,932 | A | * | 6/1999 | Takayama | 72/405.09 |
| 5,970,763 | A | * | 10/1999 | Takayama | 72/1 |
| 6,701,769 | B2 | * | 3/2004 | Shiroza | 72/405.1 |
| 7,210,326 | B2 | * | 5/2007 | Kawamoto | 72/405.11 |
| 7,219,525 | B2 | * | 5/2007 | Kawamoto | 72/405.11 |
| 2005/0056077 | A1 | * | 3/2005 | Kawamoto | 72/405.1 |

FOREIGN PATENT DOCUMENTS

| | | |
|---|---|---|
| JP | 48-2456 | 1/1973 |
| JP | 2-99298 | 4/1990 |
| JP | 2003-200231 | 7/2003 |

* cited by examiner

*Primary Examiner*—Dmitry Suhol
(74) *Attorney, Agent, or Firm*—Wenderoth, Lind & Ponack, L.L.P.

(57) ABSTRACT

A rotating speed of a main motor (61) of a second press (3) is regulated so that an angular difference between a press angle of a first press (2) and a press angle of a second press (3) is constant. Further, when the work is carried-out from the first press (2), a work transportation device (10) is controlled based on a press angle of the first press (2). When the work is carried-in into the second press (3), the work transportation device (10) is controlled based on a press angle of the second press (3). Further, when the work is transported, the work transportation device 10 is controlled based on a signal from a transportation device control section (31) for controlling the work transportation device (10). The arrangement above improves production efficiency in press forming and reduces maintenance cost and frequency.

9 Claims, 12 Drawing Sheets

TANDEM PRESS LINE, OPERATION CONTROL METHOD FOR TANDEM PRESS LINE, AND WORK TRANSPORTATION DEVICE FOR TANDEM PRESS LINE

FIELD OF THE INVENTION

The present invention relates to an operation control method for a tandem press line which comprises press apparatuses for forming a work, and a work transportation device for carrying-out, transporting, and carrying-in a work between two press apparatuses, disposing a plurality of press apparatuses, and disposing the work transportation device between pressing apparatuses which are adjacent to each other, and relates to a tandem press line. Also, the present invention relates to a work transportation device on a tandem press line.

BACKGROUND ART

As a form of a press which efficiently performs a plurality of workings such as drawing, bending, piercing and trimming, on a single work, a tandem press line is known. In the tandem press line, a plurality of press apparatuses (hereafter referred to as "presses") which are arranged in line are provided, and a work is transported from the press on the upstream side to that on the downstream side, being sequentially press formed by the respective presses. The work is transported by hand, a work transportation device, or the like. Each press is provided with a main motor, and the rotation of the main motor is converted into a vertical operation (a reciprocating motion) through a drive mechanism. The respective main motors are separately controlled, and thus the slides of the presses are vertically moved independently and individually. Hereinbelow, the press and the work transportation device will be described, respectively.

About Press:

FIG. 11 is a schematic diagram of the drive mechanism, in which, as an example of it, the drive mechanism of a crank press is shown. The rotational shaft of the main motor is provided with a motor pulley 52, and the motor pulley 52 is connected to a flywheel 54 through a belt 53. The flywheel 54 and a first engaging member of a clutch 55 are connected to each other, and a second engaging member of the clutch 55 is connected to a drive shaft 56. Further, the drive shaft 56 is provided with a brake 57. A part of the drive shaft 56 is engaged with a main gear 58, and the main gear 58 is fixedly installed to a part of a crankshaft 59. To the crank portion of the crankshaft 59, a slide 16 is suspended through connecting rods 45.

With this drive mechanism, the flywheel 54 is turned by the main motor 51, and the rotational energy of the flywheel 54 is transmitted to the crankshaft 59 through the clutch 55 and the main gear 58. Then, the crankshaft 59 is turned, and the rotation of it is converted into the vertical movement of the slide 16. By engaging or releasing the clutch 55, and releasing and applying the brake 57, the slide 16 is moved and stopped, respectively. The drive mechanism may be further provided with a transmission which contains a combination of a plurality of gear stages.

The slide vertical moving operation in each press is controlled as follows. When the slide 16 reaches the upper dead point, the clutch 55 is released with the brake 57 being applied, which stops the slide 16 at the upper dead point. When the work after the working is carried-out from the working station in the press, and further the work before the working is carried-in into the working station in the press, the clutch 55 is engaged, the brake 57 being released, which causes the slide 16 to be lowered from the upper dead point. Then, when the slide 16 passes through the lower dead point to reach the upper dead point, the clutch 55 is released and the brake is applied, which results in the slide 16 being again stopped at the upper dead point. Thus, with each press, engagement and release of the clutch 55, and release and application of the brake 57 are repeated, resulting in intermittent operation.

With a tandem press line, presses can be combined and arranged to suit to the application. In addition, when there is no need for using of a part of the presses in the tandem press line, the part of the presses can be stopped, or used for press forming of another work. Thus, the tandem press line can be applied for a variety of styles of press forming, and thus can have a high degree of freedom.

The transfer press, which is similar to the tandem press line, also has a plurality of working stations which are disposed in line. But with the transfer press, a single slide takes charge of a plurality of working stations, and a single main motor vertically moves the respective slides. Therefore, the slide vertical movements of the respective presses are synchronized. Consequently, the production efficiency is high, but the style of press forming is fixed, thus the degree of freedom is low.

About Work Transportation Device:

As the method for work transportation between presses which are adjacent to each other, the robot method and the loader and unloader method are known. The robot method refers to a method in which a multiarticulated type handling robot is disposed between presses which are adjacent to each other, and this handling robot carries out the work from the press for the previous process, and carries in that work into the press for the subsequent process. On the contrary to this, the loader and unloader method refers to a method in which a loader and an unloader having a link construction are provided by the side of the press body on the upstream side and the downstream side, respectively, and between the unloader on the upstream side and the loader on the downstream side, a shuttle carriage is provided, such that the carrying-out and carrying-in of the work from/into the press body are performed by the unloader and the loader, respectively, and the transporting of the work to the subsequent process is performed by the shuttle carriage.

However, with these conventional methods, the respective intermittent motions of the presses on the upstream side and the downstream side must be followed by the transporting of the work, and yet there is the need for preventing any interference from occurring between the work and the die or the like during transporting the work, which leads to problems in that the work handling cannot be performed at high speed, and thus the improvement of the production speed is limited. Further, with the robot method, teaching of the transporting locus is difficult and takes a long time. Also, with the loader and unloader method, a shuttle carriage must be provided between adjacent presses, which requires a large-scale apparatus to be constructed and a large space for the large-scale apparatus.

To solve these problems, the applicant of the present application has already proposed, as a prior Japanese application, a work transporting method and a work transportation device for tandem press line that allow teaching of the work transporting locus to be performed in a short time period, and yet allow the work transportation to be performed at high speed (Japanese Patent Application No. 2001-400849). The work transportation device of this prior application comprises a configuration that lifting beams which are in parallel with the work transporting direction and can be freely moved vertically are provided; carriers and sub-carriers which can be freely moved along the longitudinal direction of the lifting beams; and a cross bar having work holding means is provided between a pair of right and left sub-carriers.

The most efficient means for improving the production efficiency for a tandem press line is to continuously operate the respective presses, and further to cause the work transportation device to follow the press operation. However, in order to carry out such an operation, the following problems must be overcome.

For example, assuming that the respective slides of a plurality of presses are simultaneously lowered at the same speed from the upper dead point for press forming, if the respective slides perform the one stroke operation and return to the upper dead point with the same timing, no problems occur, but, actually the timings have a mutual discrepancy. This is because the respective presses are different in slowdown, and thus the period of the press operation differs from press to press.

The slowdown refers to a phenomenon in which the number of revolutions of the flywheel is temporarily lowered, and this phenomenon cannot be avoided due to the loading in the press forming, and the like. The slowdown depends upon a variety of factors, such as the energy required for a particular press forming, the capacity of the main motor, the size of the flywheel, and the like, however, these factors vary from press to press, thus the slowdown for the respective presses varies.

FIG. 12 is a diagram illustrating the slide position versus the elapsed time, showing the change in the slide position of adjacent presses when they are continuously operated. As shown with the waveforms A and B, even if a prescribed phase difference $T_1$ is set for the slide operations of the adjacent presses, and the operation is started, the phase difference is gradually changed with the time elapse under the influence of the above-mentioned slowdown, resulting in the waveforms being changed into A and B', for example. At the beginning, the amount of change in the phase difference is small, thus the carrying-out of the work from the press on the upstream side and the carrying-in of the work into the press on the downstream side can be continuously performed. However, as the time elapses, the amount of change in the phase difference is increased. Then when the amount of such change is increased to a certain degree, the timing relationship between the carrying-out of the work from the press on the upstream side and the carrying-in of the work into the press on the downstream side gets out of order so greatly that the operation of the line cannot be further continued.

With such a problem being presented, the conventional tandem press line has had to be intermittently operated in order to safely and positively carry-in and carry-out the work. Thus, the improvement of the production efficiency could not have been expected.

In addition, intermittent operation requires engagement and release of the clutch, and application of the brake. The engagement and release of the clutch, and the application of the brake involve high noise, and also cause the facing provided for the clutch and the brake to be worn. If the facing wear is heavy, the life of the facing is shortened, resulting in the facing replacement being required. Therefore, the maintenance cost is increased.

In addition, the invention of the prior application (Japanese Patent Application No. 2001-400849) is that which was proposed only about the hardware configuration of the work transportation device in order to provide high-speed work transportation in the tandem press line, thus there has been room for examination concerning the control technology for efficiently transporting the work while following up the respective presses in the intermediate transportation between two presses which are independently operated.

The present invention has been made in view of the above circumstances, and to achieve the purposes of improving the production efficiency of press forming and reducing the maintenance cost and the maintenance frequency.

SUMMARY OF THE INVENTION

Thus, a first aspect of the present invention provides an operation control method for a tandem press line in which a work transportation device is disposed between a press apparatus on the upstream side and a press apparatus on the downstream side which are adjacent to each other, wherein the operation of the press apparatus on the downstream side is controlled on the basis of a signal in accordance with the operation of the press apparatus on the upstream side;

in the work carrying-out section in the vicinity of the press apparatus on the upstream side, the operation of the work transportation device is controlled on the basis of a signal in accordance with the operation of the press apparatus on the upstream side; in the work carrying-in section in the vicinity of the press apparatus on the downstream side, the operation of the work transportation device is controlled on the basis of a signal in accordance with the operation of the press apparatus on the downstream side; and in the work transporting section between the press apparatus on the upstream side and the press apparatus on the downstream side, the operation of the work transportation device is controlled on the basis of a signal which is unique to the work transportation device.

According to the first aspect of the present invention, the rotational speed of a main motor 61 for a second press 3 is controlled such that the angular difference between the press angle that is detected by an encoder 91 provided for a first press 2 (a signal in accordance with the operation of the press on the upstream side), and the press angle that is detected by an encoder 92 provided for the second press 3 (a signal in accordance with the operation of the press on the downstream side) is maintained constant. When the angular difference is changed, the rotational speed of the main motor 61 for the second press 3 is changed depending upon the angular difference. Then, the operation of the slide 16 of the second press 3 is changed. Thus the phase difference between the operation of the slide 16 of the first press 2 and the operation of the slide 16 of the second press 3 is maintained constant.

In addition, in a prescribed press angle range where the carrying-out of the work from the first press 2 is performed, a work transportation device 10 is controlled such that it is synchronized with the first press 2 on the basis of the press angle detected by the encoder 91 provided for the first press 2. In a prescribed press angle range where the carrying-in of the work into the second press 3 is performed, the work transportation device 10 is controlled such that it is synchronized with the second press 3 on the basis of the press angle detected by the encoder 92 provided for the second press 3. Further, in an angle range excluding the prescribed press angle ranges before the start of carrying-in the work and after the termination of carrying-out the work, the work transportation device 10 is controlled on the basis of a signal from a transportation device control section 31 which generates a signal for controlling the work transportation device. Thus, the operation of the work transportation device is controlled while the object to be followed by it is switched over, thus in carrying-in and carrying-out the work, the operation of the work transportation device can be synchronized with the operation of the press slide which is the object to be followed.

According to the first aspect of the present embodiment, the slide motion of the press on the downstream side is corrected in real time to the slide motion of the press on the upstream side, and the work carrying-in/transportation/carrying-out operation by the work transportation device is performed to the slide motions of the adjacent presses, thus the tandem press line can be continuously operated, resulting in the production efficiency being greatly improved. The ability to provide continuous operation eliminates the need for clutch engagement and release, and brake application, which has been required for intermittent operation, thus the wear of the facings provided for the clutch and the brake can be reduced. Therefore, the maintenance cost and the maintenance frequency can be reduced. In addition, with the elimination of the need for intermittent operation, the noise resulting from the engagement and release of the clutch and the application of the brake can be eliminated.

In a second aspect of the present invention, in the first aspect of the present invention, the indication value representing the slide position of press apparatuses which are adjacent to each other are rendered corresponding to each other are previously stored;

the indication value representing the slide position of each press apparatus is detected; the corresponding indication value for the press apparatus on the downstream side is determined on the basis of the indication value detected for the press apparatus on the upstream side; and the operation of the press apparatus on the downstream side is controlled such that the indication value detected for the press apparatus on the downstream side is identical to the determined indication value for the press apparatus on the downstream side.

According to the second aspect of the present invention, the displacement characteristic for the slide 16a of the first press (the press apparatus on the upstream side) 2 and the displacement characteristic for the slide 16b of the second press (the press apparatus on the downstream side) 3 are previously stored. Between the two displacement characteristics, a certain value of phase difference is provided, and the position of the slide 16a and the position of the slide 16b are stored so as to correspond to each other.

On the basis of the position of the slide 16a that has been detected by the position sensor 95 provided in the first press 2, the corresponding position of the slide 16b is determined. The rotational speed of the main motor of the second press 3 is controlled such that the position of the slide 16b that has been detected by the position sensor 96 provided in the second press 3 is identical to the determined position of the slide 16b. Then, the operation of the slide 16 of the second press 3 is changed. Thus, the phase difference between the operation of the slide 16 of the first press 2 and the operation of the slide 16 of the second press 3 is maintained constant.

The control of the work transportation device is the same as that for the first aspect of the present invention.

According to the second aspect of the present invention, the same effects of the first aspect of the present invention can be obtained. The second aspect of the present invention is applicable to a press with which the press angle is not detected.

In a third aspect of the present invention, each press apparatus is continuously operated in the first aspect of the present invention.

In a fourth aspect of the present invention when the operation of the press apparatus on the downstream side is controlled, the speed of a motor provided for the press apparatus on the downstream side is controlled in the first aspect of the present invention.

In a fifth aspect of the present invention, in the first aspect of the present invention, when the operation of the work transportation device is controlled, the operation of the work transportation device is controlled such that the difference between the signal in accordance with the operation of the press apparatus on the upstream side and a signal unique to the work transportation device is reduced at the boundary between the work carrying-out section and the work transporting section, and the difference between the signal in accordance with the operation of the press apparatus on the downstream side and a signal unique to the work transportation device is reduced at the boundary between the work carrying-in section and the work transporting section.

According to the fifth aspect of the present invention, when the operation of the work transportation device is to be synchronized with the operation of the press apparatus on the upstream side or the operation of the press apparatus on the downstream side, the operation of the work transportation device can be more smoothly controlled, which allows more efficient press forming to be realized.

A sixth aspect of the present invention provides a tandem press line in which a work transportation device is disposed between a press apparatus on the upstream side and a press apparatus on the downstream side which are adjacent to each other, comprising:

a press controlling section which controls the operation of the press apparatus on the downstream side on the basis of a signal in accordance with the operation of the press apparatus on the upstream side; and a work transportation control section which, in the work carrying-out section in the vicinity of the press apparatus on the upstream side, controls the operation of the work transportation device on the basis of a signal in accordance with the operation of the press apparatus on the upstream side; in the work carrying-in section in the vicinity of the press apparatus on the downstream side, controls the operation of the work transportation device on the basis of a signal in accordance with the operation of the press apparatus on the downstream side; and in the work transporting section between the press apparatus on the upstream side and the press apparatus on the downstream side, controls the operation of the work transportation device on the basis of a signal which is unique to the work transportation device.

In a seventh aspect of the present invention, in the sixth aspect of the present invention, the press control section detects the indication value representing the slide position of each press apparatus; determines the corresponding based on value for the press apparatus on the downstream side on the basis of the based on value detected for the press apparatus on the upstream side; and controls the operation of the press apparatus on the downstream side such that the based on value detected for the press apparatus on the downstream side is identical to the determined based on value for the press apparatus on the downstream side.

In an eighth aspect of the present invention, each press apparatus is continuously operated in the sixth aspect of the present invention.

In a ninth aspect of the present invention, in the sixth aspect of the present invention, the press control section controls the speed of a motor provided for the press apparatus on the downstream side.

In a tenth aspect of the present invention, in the sixth aspect of the present invention, the work transportation control section controls the operation of the work transportation device such that the difference between the signal in accordance with the operation of the press apparatus on the upstream side and a signal unique to the work transportation device is reduced at the boundary between the work carrying-out section and the work transporting section, and the difference between the signal in accordance with the operation of the press apparatus on the downstream side and a signal unique to the work transportation device is reduced at the boundary between the work carrying-in section and the work transporting section.

The sixth to tenth aspects of the present invention correspond to the first to fifth aspects of the present invention, the former providing inventions about method, while the latter providing inventions about product.

An eleventh aspect of the present invention provides a work transportation device for a tandem press line comprising a work transporting section which is disposed between a press apparatus on the upstream side and a press apparatus on the downstream side which are adjacent to each other among a plurality of press apparatuses, and a control section which controls the operation of the work transporting section, wherein the control section controls the operation of the work transportation device on the basis of a signal in accordance with the operation of the press apparatus on the upstream side in the work carrying-out section in the vicinity of the press apparatus on the upstream side; controls the operation of the work transportation device on the basis of a signal in accordance with the operation of the press apparatus on the downstream side in the work carrying-in section in the vicinity of the press apparatus on the downstream side; and controls the operation of the work transportation device on the basis of a signal which is unique to the work transportation device in the work transporting section between the press apparatus on the upstream side and the press apparatus on the downstream side.

In a twelfth aspect of the present invention, in the eleventh aspect of the present invention, the control section controls the operation of the work transportation device such that the difference between the signal in accordance with the operation of the press apparatus on the upstream side and a signal unique to the work transportation device is reduced at the boundary between the work carrying-out section and the work transporting section, and the difference between the signal in accordance with the operation of the press apparatus on the downstream side and a signal unique to the work transportation device is reduced at the boundary between the work carrying-in section and the work transporting section.

The eleventh and twelfth aspects of the present invention are inventions related only to the work transportation device of the sixth and seventh aspects of the present invention.

DETAILED DESCRIPTION OF PREFERRED EMBODIMENTS

Hereinbelow, embodiments of the present invention will be described with reference to the drawings.

Figure 1:
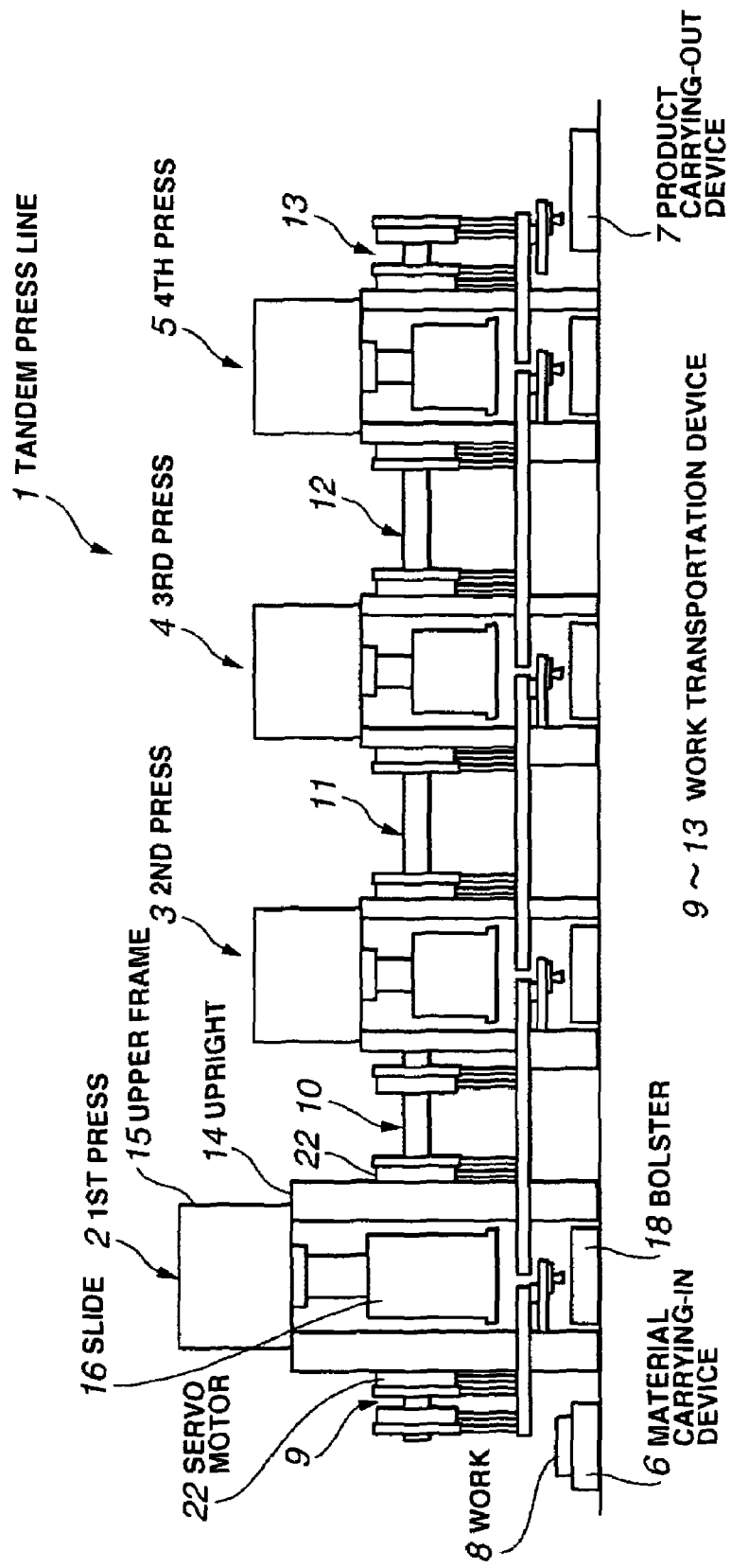
FIG. 1 is a front view of a tandem press line according to the present embodiment.
Figure 2:
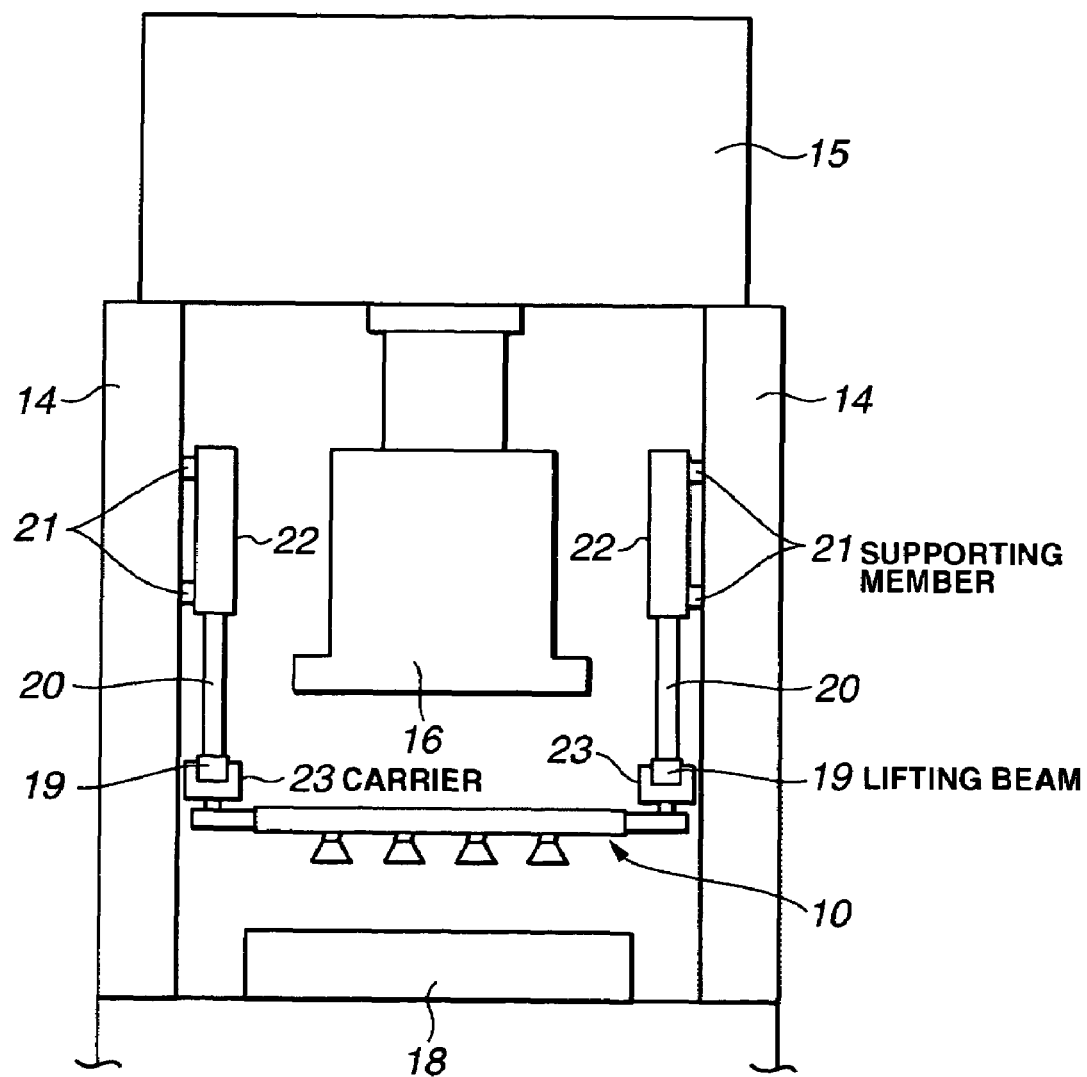
FIG. 2 is a side view of the tandem press line according to the present embodiment.
Figure 3:
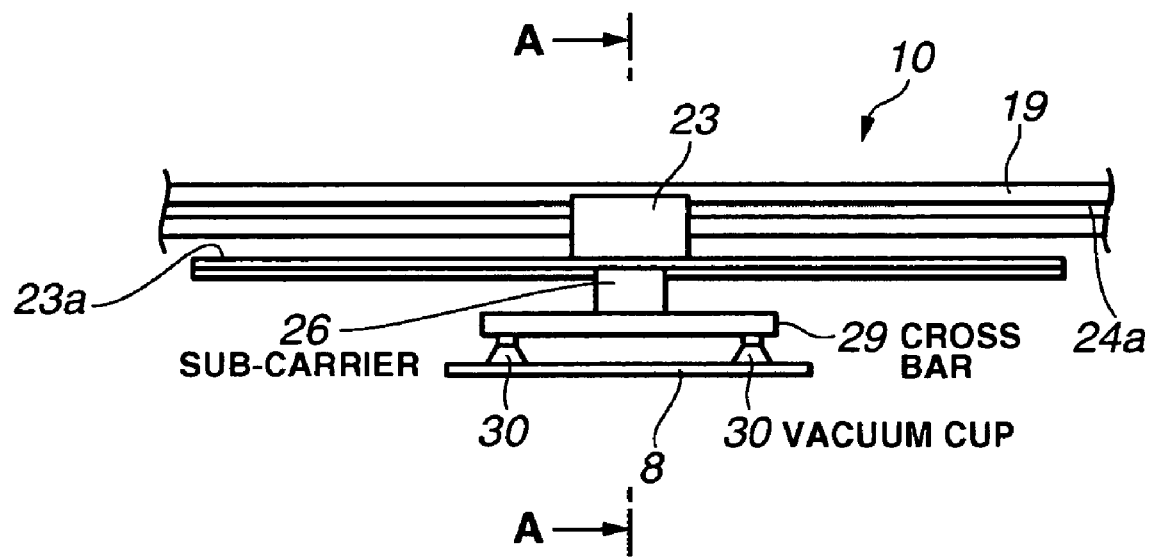
FIG. 3 is a side view of a work transportation device.
Figure 4:
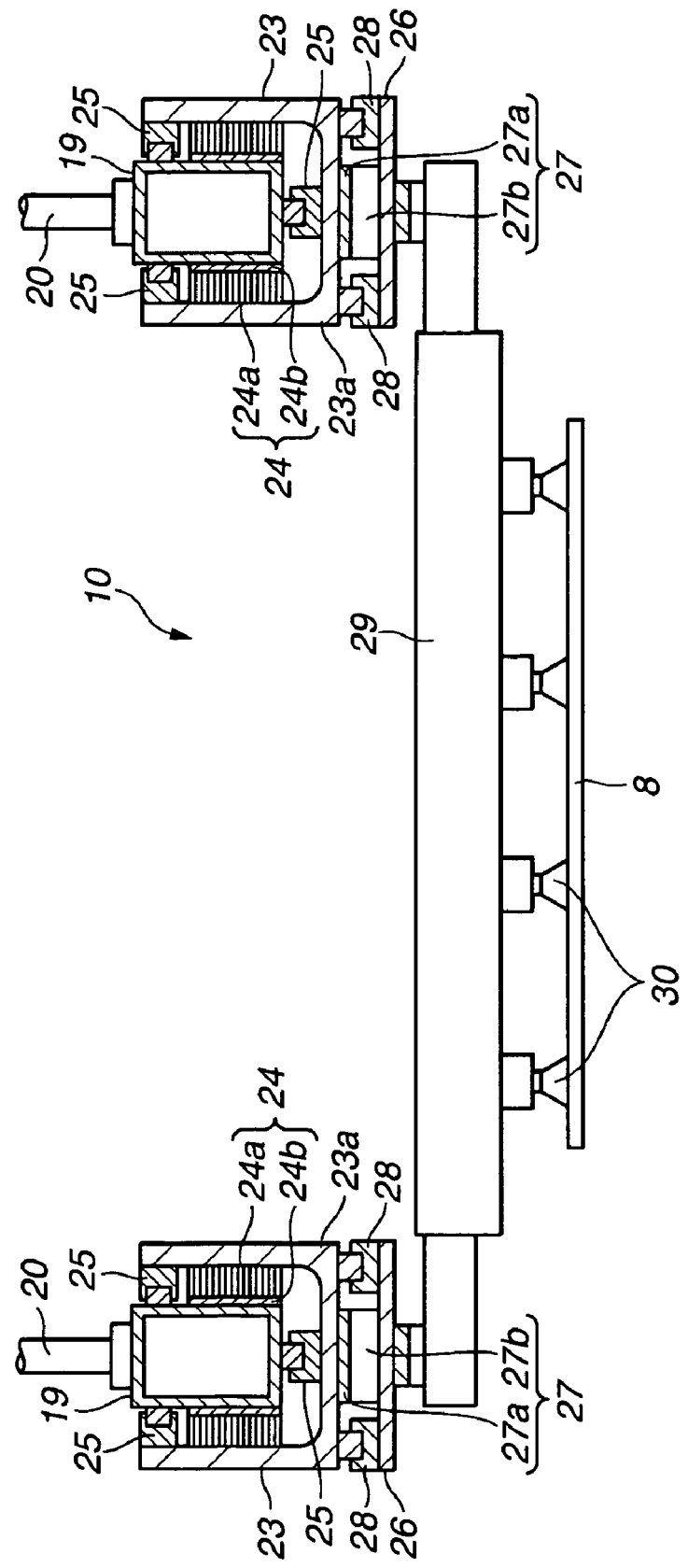
FIG. 4 is a sectional view taken along line A-A in FIG. 3.

FIG. 1 is a front view of a tandem press line according to the present embodiment. FIG. 2 is a side view of the tandem press line according to the present embodiment. FIG. 3 is a side view of a work transportation device. FIG. 4 is a sectional view taken along line A-A in FIG. 3.

The tandem press line 1 of the present embodiment is configured to comprise first to fourth presses 2, 3, 4, and 5 which are disposed in series from the upstream side (left side of the drawing) to the downstream side (right side of the drawing); a material carrying-in apparatus 6 which is disposed on the upstream side of the first press 2, the most upstream side; a product carrying-out apparatus 7 which is disposed on the downstream side of the fourth press 5, the most downstream side; a work transportation device 9 which transports/carries-in a work 8 on the material carrying-in apparatus 6 to/into the working station of the first press 2; work transportation devices 10, 11, 12 which perform carrying-out/transporting/carrying-in of the work 8 between the respective working stations of the mutually adjacent presses 2, 3, 4, 5; and a work transportation device 13 which performs carrying-out/transporting of the work 8 from the working station of the fourth press 5 onto the product carrying-out apparatus 7.

Each press 2, 3, 4, 5 comprises an upright 14 as a main body frame; an upper frame 15 which, being disposed above the upright 14, incorporates a drive mechanism; a slide 16 which, being vertically movably supported by the upright 14, is vertically operated through the drive mechanism; and a bolster 18 which, being disposed opposed to the slide 16, is provided on a bed 17, and is configured such that the work 8 is subjected to working by an upper die which is loaded onto the lower end of the slide 16 and a lower die which is loaded onto the upper end of the bolster 18.

Herein, the detailed constructions, and the like, of the work transportation devices 9 to 13 will be described. The basic configuration of these respective work transportation devices 9 to 13 is substantially the same, thus as a typical example, the configuration, and the like, of the work transportation device 10, which is disposed between the presses 2, 3 will be mainly described below.

As shown in FIG. 2 and FIG. 4, the work transportation device 10 comprises a pair of lifting beams 19, 19 which are disposed in parallel mutually spaced from each other on both sides (on the right and left sides of the drawing) of the work transporting direction. Onto the upper portion of the lifting beam 19, a rod is mounted which extends upward along the upright 14. On the other hand, lifting axis servo motors 22 are loaded onto the upper portion of the upright 14 through supporting members 21, and the pinion mounted to the output shaft of the servo motor 22 is engaged with the rack provided for the rod 20 for allowing the lifting beam 19 to be vertically moved through the forward or backward turning of the servo motor 22. Herein, the servo motor 22 is controlled on the basis of the previously set feeder motion by a control signal from a transportation device control section 31 (described later).

For the respective right and left lifting beams 19, a carrier (main carrier) 23 having a substantially U-shaped cross section is provided so as to embrace the lifting beam 19, and this carrier 23 is adapted to be able to move along the longitudinal direction of the lifting beam 19. And, as shown in FIG. 4, between both outside surfaces of the lifting beam 19 and the inside surface of the carrier 23 that is opposed thereto, a pair of linear motors 24 are provided as traveling means for moving the carrier 23 along the lifting beam 19. Further, between both upper portion outside surfaces of the lifting beam 19 and the inside surface of the carrier 23 that is opposed thereto, and between the bottom surface of the lifting beam 19 and the bottom surface of the carrier 23 that is opposed thereto, a linear guide 25 is disposed, respectively, and by these three-point supporting linear guides 25, the traveling motion of the carrier 23 with respect to the lifting beam 19 is guided. Herein, the linear motor 24 essentially consists of a magnet 24a which is disposed along the transporting direction (the longitudinal direction) on both sides of the lifting beam 19, and a coil 24b which is disposed along the transporting direction (the longitudinal direction) on the inside surface of the carrier 23 that is opposed to the magnet 24a, and the armature (carrier 23) having this coil 24b is adapted to linearly travel in accordance with a change in magnetic field that is produced on the stator (lifting beam 19) having the magnet 24a. Further, under the bottom of the carrier 23, a base plate 23a of a desired length is provided so as to extend along the work transporting direction, such that, along this base plate 23a, a sub-carrier 26 is capable of being moved. The traveling means for this sub-carrier 26 comprises a linear motor 27 essentially consisting of a magnet 27a which is disposed on the bottom surface of the base plate 23a along the transporting direction and a coil 27b which is disposed on the top surface of the sub-carrier 26 that is opposed to the magnet 27a. Further, between the respective right and left portions of the bottom surface of the base plate 23a and the top surface of the sub-carrier 26 that is opposed to the base plate 23a, a linear guide 28 is disposed, and by these linear guides 28, the traveling motion of the sub-carrier 26 with respect to the carrier 23 is guided. And, the pair of sub-carriers, 26 which are opposed to each other are connected by a cross bar 29, and onto the bottom of this cross bar 29, a plurality of vacuum cups 30 are loaded for sucking the work 8 with these vacuum cups 30. Herein, the linear motors 24, 27 are controlled on the basis of the previously set feeder motion by a control signal from the transportation device control section 31 later described, whereby the traveling motion of the carrier 23 with respect to the lifting beam 19 along the transporting direction, and the traveling motion of the sub-carrier 26 with respect to the carrier 23 along the transporting direction are controlled.

With the work transportation device 10 thus configured, by vertically moving the lifting beam 19 through the driving of the lifting axis servo motor 22, the vacuum cups 30 can be vertically moved with the carriers 23, the sub-carriers 26, and the cross bar 29. In addition, by moving the carriers 23 through the driving of the linear motors 24 along the longitudinal direction of the lifting beams 19, and offsetting the sub-carriers 26 through the driving of the linear motors 27 along the moving direction of the carriers 23, the cross bar and the vacuum cups 30 can be moved in the work transporting direction. Thus, by controlling the positions of the two orthogonal driving axes in the vertical and/or transporting direction, the traveling loci of the vacuum cups 30, in other words, the transporting locus of the work 8 can be controlled.

Next, control of the first to fourth presses 2 to 5, and control of the work transportation devices 9 to 13 will be described, respectively.

1. Control of Presses

The present embodiment provides two different modes of press control. Hereinafter, these modes will be referred to as the first mode of press control and the second mode of press control, respectively, for explanation.

1-1 First Mode of Press Control

Figure 5:
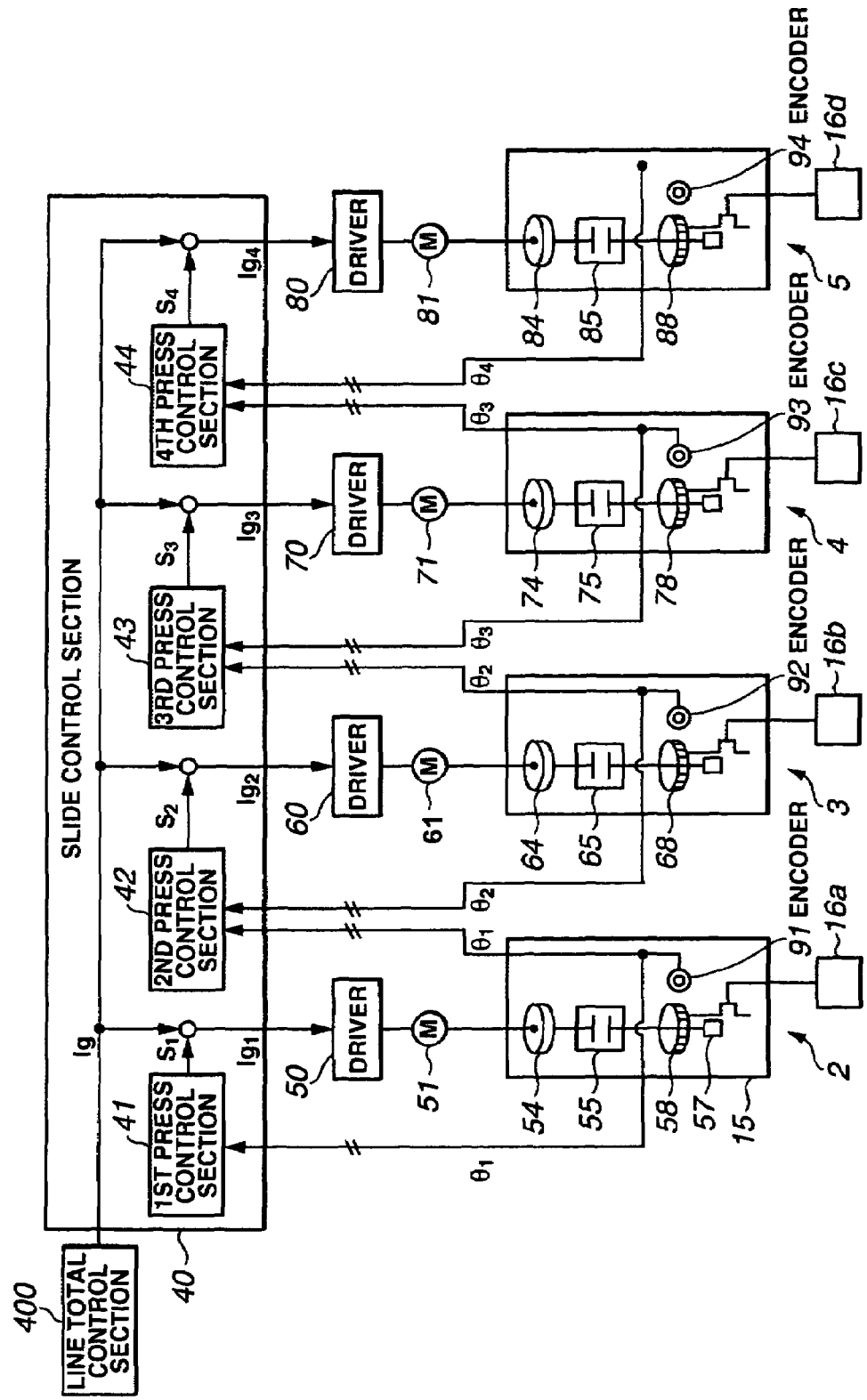
FIG. 5 is a control system configuration diagram according to the first mode of press control.

FIG. 5 is a control system configuration diagram according to the first mode of press control.

Figure 11:
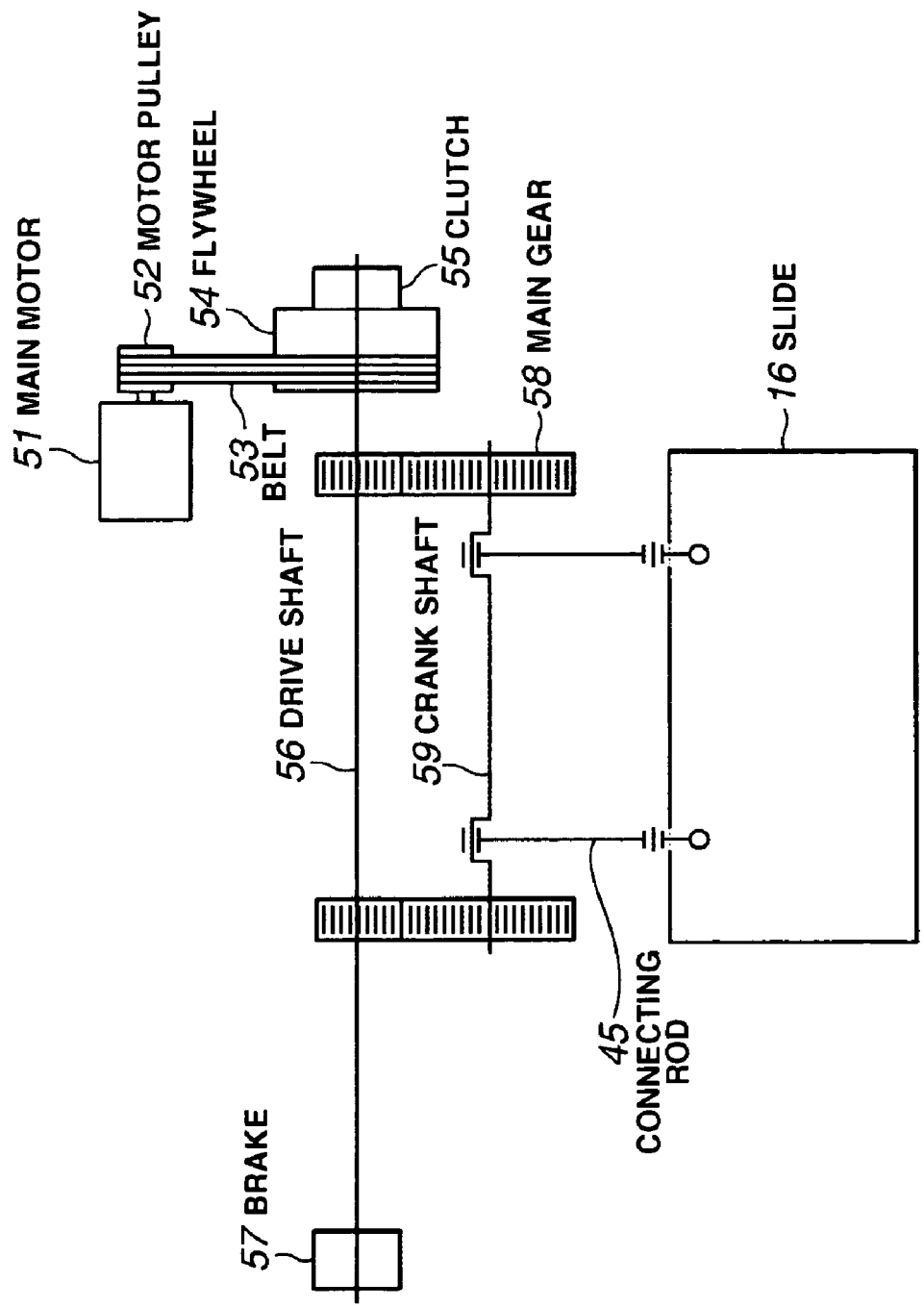
FIG. 11 is a schematic diagram of the drive mechanism.
Figure 12:
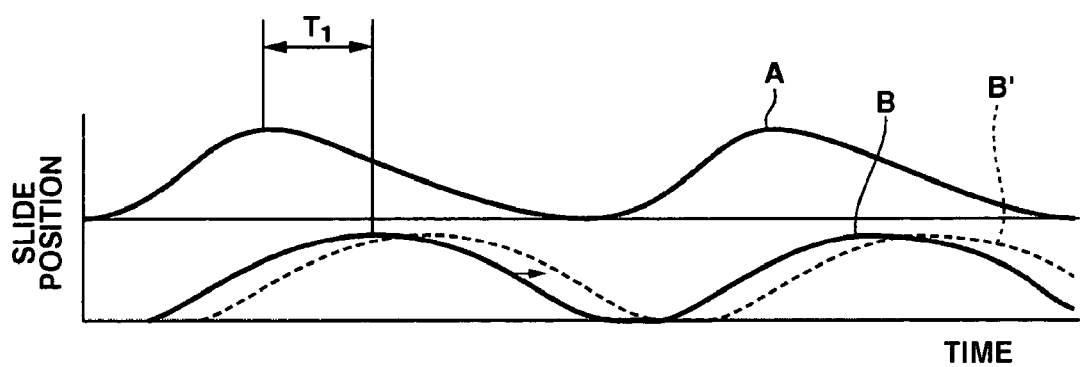
FIG. 12 is a diagram illustrating the slide position versus the elapsed time.

The upper frame 15 of the first press 2 incorporates a drive mechanism, which construction may be the same as that as shown in FIG. 11. In FIG. 5, the same drive mechanism as shown in FIG. 11 is shown, being further simplified. As previously described with reference to FIG. 11, the drive mechanism is provided with a flywheel 54, a clutch 55, a brake 57, main gears 58, and a crankshaft 59. In addition, in the upper frame, an encoder 91 is provided. The encoder 91 detects the angle $\theta_1$ of the main gear 58 as a press angle (crank angle), outputting the detected angle $\theta_1$ to a slide control section 40. The driver 50 controls the rotational speed of the main motor 51 in accordance with the main gear angular velocity command $I_g$ which is outputted from the slide control section 40. The main motor 51 turns the flywheel 54. The configuration of the drive mechanism, the motor, the driver, the encoder, and the like of the presses 3 to 5 is the same as that of the first press 2.

The line total control section 400 totally controls the tandem press line 1, outputting a speed command to the later described transportation device control section 31, and also outputting a main gear angular velocity command $I_g$ to the slide control section 40 on the press side, such that the work transportation and the press forming are performed in synchronization.

The slide control section 40 is provided with a first press control section 41, a second press control section 42, a third press control section 43, and a fourth press control section 44. The slide control section 40 outputs a main gear angular velocity command $I_g$ to the driver corresponding to the press which has the longest rise time. In addition, the slide control section 40 uses a correction signal $S_1$ generated in the first press control section 41 to correct the main gear angular velocity command $I_g$, outputting a main gear angular velocity command $I_{g1}$ after the correction to the driver 50 for the first press 2. In addition, the slide control section 40 uses a correction signal $S_2$ generated in the second press control section 42 to correct the main gear angular velocity command $I_g$, outputting a main gear angular velocity command $I_{g2}$ after the correction to the driver 60 for the second press 3. In addition, the slide control section 40 uses a correction signal $S_3$ generated in the third press control section 43 to correct the main gear angular velocity command $I_g$, outputting a main gear angular velocity command $I_{g3}$ after the correction to the driver 70 for the third press 4. In addition, the slide control section 40 uses a correction signal $S_4$ generated in the fourth press control section 44 to correct the main gear angular velocity command $I_g$, outputting a main gear angular velocity command $I_{g4}$ after the correction to the driver 80 for the fourth press 5.

The first press control section 41 receives the detected angle $\theta_1$ from the encoder 91 for the first press 2 to generate a main gear correction signal $S_1$ for correcting the main gear angular velocity.

The second press control section 42 receives the detected angle $\theta_1$ from the encoder 91 for the first press 2 and the detected angle $\theta_2$ from the encoder 92 for the second press 3 to generate a correction signal $S_2$ in accordance with the difference between the two detected angles, $\theta_{1-2}$.

The third press control section 43 receives the detected angle $\theta_2$ from the encoder 92 for the second press 3 and the detected angle $\theta_3$ from the encoder 93 for the third press 4 to generate a correction signal $S_3$ in accordance with the difference between the two detected angles, $\theta_{2-3}$.

The fourth press control section 44 receives the detected angle $\theta_3$ from the encoder 93 for the third press 4 and the detected angle $\theta_4$ from the encoder 94 for the fourth press 5 to generate a correction signal $S_4$ in accordance with the difference between the two detected angles, $\theta_{3-4}$.

Next, the controlling manner for the second press 3 in the present embodiment will be described (the controlling manner is the same for the third press 4 and the fourth press 5).

Figure 6:
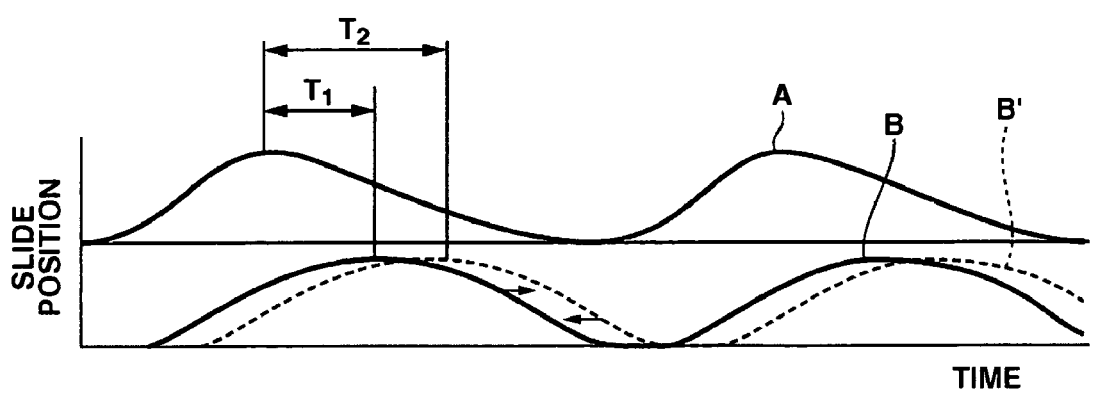
FIG. 6 is a diagram illustrating the slide position versus the elapsed time.

FIG. 6 is a diagram illustrating the slide position versus the elapsed time, showing the change in the slide position when the first press 2 and the second press 3, which are adjacent to each other, are continuously operated. The waveform A depicts the periodic change in the slide position of the first press 2, while the waveform B depicts the periodic change in the slide position of the second press 3. The top of the waveform A, B represents the upper dead point for the slide, while the bottom thereof represents the lower dead point for the slide. Hereinbelow, there will be a description with reference to FIG. 5 and FIG. 6.

First, it is assumed that the relative positions of the slide 16a of the first press 2 and the slide 16b of the second press 3 are held in a prescribed relationship. In other words, the phase difference between the waveforms A and B is held at a prescribed value $T_1$.

However, if the angular difference between the crank angle for the first press 2 and the crank angle for the second press 3 is changed due to a difference in slowdown, for example, the periodic change in the slide position will be shifted. For example, if the angular difference is increased, the waveform B will be shifted in the positive direction of the time base with respect to the waveform A, as shown in FIG. 6, resulting in the relationship between the periodic change in the slide position of the first press 2 and the periodic change in the slide position of the second press 3 being turned into that between the waveform A and the waveform B' with the value of phase difference being changed to $T_2$.

As shown in FIG. 5, the encoder 91 for the first press 2 detects the crank angle $\theta_1$ (the angle of the main gear 58), outputting the detected crank angle $\theta_1$ to the first press control section 41 and the second press control section 42. The encoder 92 for the second press 3 detects the crank angle $\theta_2$ (the angle of the main gear 68), outputting the detected crank angle $\theta_2$ to the second press control section 42 and the third press control section 43. In the second press control section 42, the angular difference $\theta_{1-2}(=\theta_1-\theta_2)$ is computed, and a correction signal $S_2$ in accordance with the angular difference $\theta_{1-2}$ is generated.

In the slide control section 40, the main gear angular velocity command $I_g$ is corrected on the basis of this correction signal $S_2$. And, in order to bring the angular difference between the crank angle for the first press 2 and the crank angle for the second press 3 to a certain desired value, a main gear angular velocity command $I_{g2}$ after the correction is generated, being outputted to the driver 60. The driver 60 turns the main motor 61 in accordance with the main gear angular velocity command $I_{g2}$. When the slide motion of the second press is faster, the main motor 61 is decelerated, while, when the slide motion of the second press is slower, the main motor 61 is accelerated.

Then, as shown in FIG. 6, the waveform B' will be shifted back in the negative direction of the time base with respect to the waveform A, resulting in the relationship between the periodic change in the slide position of the first press 2 and the periodic change in the slide position of the second press 3 being turned into that between the waveform A and the waveform B with the value of phase difference being changed back into $T_1$.

The encoder 91, 92 always detects the crank angle $\theta_1$, $\theta_2$, and the second press control section 42 always computes the angular difference $\theta_1-\theta_2$. Therefore, as the angular difference $\theta_1-\theta_2$ is changed, a correction signal $S_2$ is generated, and the slide motion of the second press 3 is corrected in real time. Therefore, actually, the periodic change in the slide position of the first press 2 and the periodic change in the slide position of the second press 3 are held in the states of the waveform A and the waveform B, respectively, with the prescribed value of phase difference, $T_1$, being held.

Also between the second press 3 and the third press 4, the same control is performed, and also between the third press 4 and the fourth press 5, the same control is performed.

The first mode of press control is applicable to presses using a main gear, such as mechanical presses, but it is also applicable to presses with no main gear, such as electric servomotor type presses, by using an imaginary press angle.

1-2 Second Mode of Press Control

Figure 7:
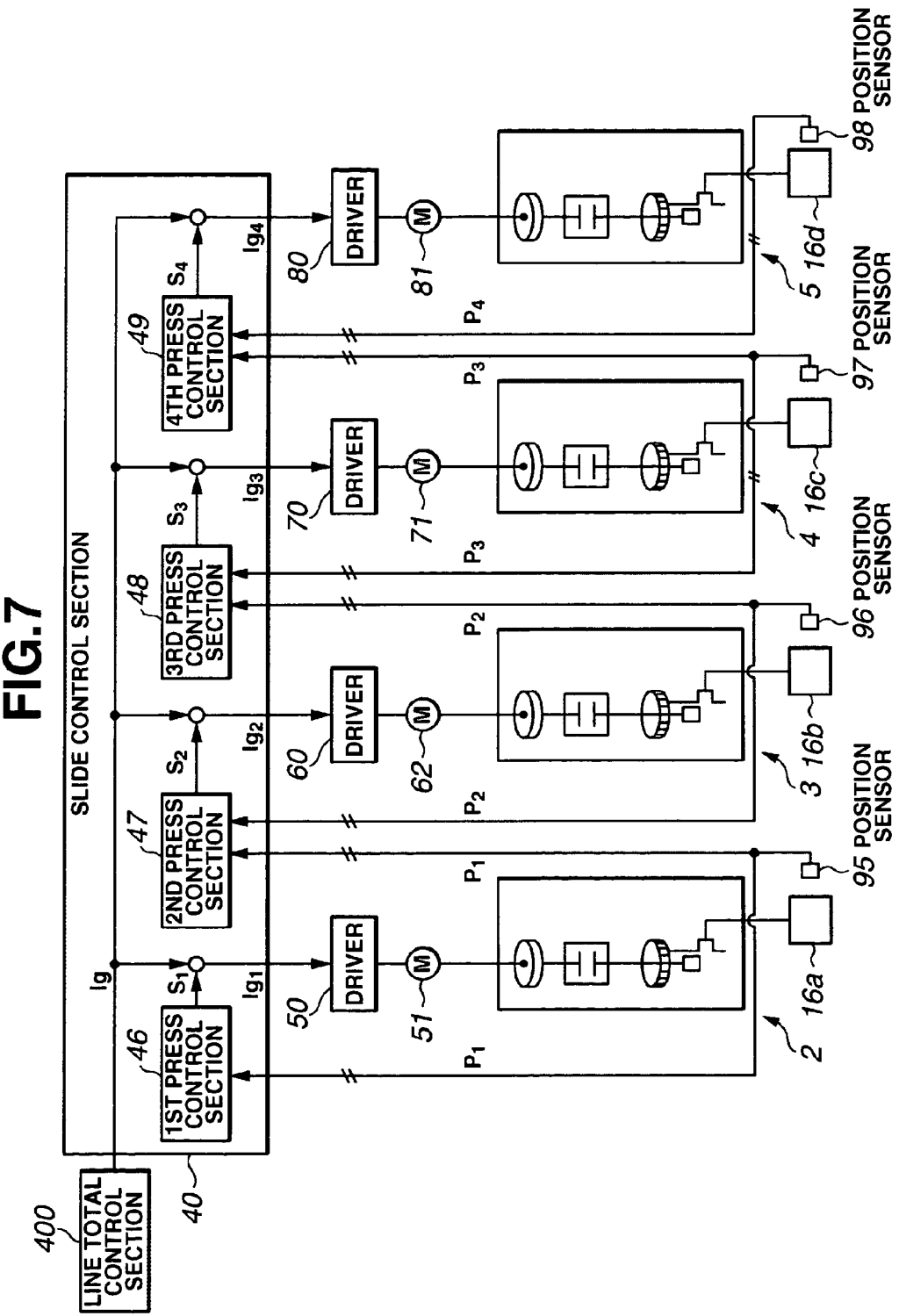
FIG. 7 is a control system configuration diagram according to the second mode of press control.

FIG. 7 is a control system configuration diagram according to the second mode of press control. The same elements as those in the control system configuration diagram as shown in FIG. 5 are provided with the same signs, and explanation of them is omitted.

The first press 2 is provided with a position sensor 95, such as a linear scale. The position sensor 95 detects the position of the slide 16a in the direction of the slide motion, outputting the detected position $P_1$ to the slide control section 40. The presses 3 to 5 are also provided with position sensors 96, 97, 98 for detecting the positions of the slides 16b to 16d, respectively.

The slide control section 40 is provided with a first press control section 46, a second press control section 47, a third press control section 48, and a fourth press control section 49.

In the second press control section 47, the displacement characteristic (waveform A) for the slide 16a of the first press 2 and the displacement characteristic (waveform B) for the slide 16b of the second press 3 are stored, with a prescribed value of phase difference, $T_1$, being given between the two displacement characteristics, and the position of the slide 16a and the position of the slide 16b being stored so as to correspond to each other. If this positional relationship is maintained, the two slides 16a, 16b can be continuously operated with the prescribed value of phase difference, $T_1$, being maintained. The second press control section 47 receives a signal for the detected position $P_1$ from the position sensor 95 for the first press 2 and a signal for the detected position $P_2$ from the position sensor 96 for the second press 3, determining the corresponding position coordinate $P_2$ for the slide 16b that corresponds to the detected position $P_1$ for the slide 16a, and generating a correction signal $S_2$ in accordance with the difference $P_{2-2}$ between the detected position $P_2$ for the slide 16b and the determined corresponding position coordinate $P_{2'}$ for the slide 16b.

In the third press control section 48, the displacement characteristic for the slide 16b of the second press 3 and the displacement characteristic for the slide 16c of the third press 4 are stored, with a prescribed value of phase difference being given between the two displacement characteristics, and the position of the slide 16b and the position of the slide 16c being stored so as to correspond to each other. If this positional relationship is maintained, the two slides 16b, 16c can be continuously operated with the prescribed value of phase difference being maintained. The third press control section 48 receives a signal for the detected position $P_2$ from the position sensor 96 for the second press 3 and a signal for the detected position $P_3$ from the position sensor 97 for the third press 4, determining the corresponding position coordinate $P_{3'}$ for the slide 16c that corresponds to the detected position $P_2$ of the slide 16b, and generating a correction signal $S_3$ in accordance with the difference $P_{3-3}$ between the detected position $P_3$ of the slide 16c and the determined corresponding position coordinate $P_{3'}$ of the slide 16c.

In the fourth press control section 49, the displacement characteristic for the slide 16c of the third press 4 and the displacement characteristic for the slide 16d of the fourth press 5 are stored, with a prescribed value of phase difference being given between the two displacement characteristics, and the position of the slide 16c and the position of the slide 16d being stored so as to correspond to each other. If this positional relationship is maintained, the two slides 16c, 16d can be continuously operated with the prescribed value of phase difference being maintained. The fourth press control section 49 receives a signal for the detected position $P_3$ from the position sensor 97 for the third press 4 and a signal for the detected position $P_4$ from the position sensor 98 for the fourth press 5, determining the corresponding position coordinate $P_{4'}$ for the slide 16d that corresponds to the detected position $P_3$ for the slide 16c, and generating a correction signal $S_4$ in accordance with the difference $P_{4-4}$ between the detected position $P_4$ for the slide 16d and the determined corresponding position coordinate $P_{4'}$ for the slide 16d.

Next, the controlling manner for the second press 3 in the second mode of press control will be described (the controlling manner is the same for the third press 4 and the fourth press 5).

At the beginning of a continuous operation, the operation is stable, and the relative positions of the slide 16a of the first press 2 and the slide 16b of the second press 3 are held in a prescribed relationship. In other words, the phase difference between the waveforms A and B is held at a prescribed value, $T_1$, as shown in FIG. 6.

However, if the relation between the slide position of the first press 2 and the slide position of the second press 3 is changed due to a difference in slowdown, for example, the periodic change in the slide position will be shifted. For example, if the phase difference is increased, the waveform B will be shifted in the positive direction of the time base with respect to the waveform A, as shown in FIG. 6, resulting in the relationship between the periodic change in the slide position of the first press 2 and the periodic change in the slide position of the second press 3 being turned into that between the waveform A and the waveform B' with the value of phase difference being changed to $T_2$.

As shown in FIG. 7, the position sensor 95 for the first press 2 detects the position coordinate $P_1$ for the slide 16a, outputting a signal for the detected position $P_1$ to the second press control section 47. The position sensor 96 for the second press 3 detects the position coordinate $P_2$ for the slide 16b, outputting a signal for the detected position $P_2$ to the second press control section 47. The second press control section 47 determines the corresponding position coordinate $P_{2'}$ for the slide 16b that corresponds to the detected position $P_1$ for the slide 16a, generating a correction signal $S_2$ in accordance with the difference $P_{2-2}$ between the detected position $P_2$ for the slide 16b and the corresponding position coordinate $P_{2'}$ for the slide 16b.

In the slide control section 40, the main gear angular velocity command $I_g$ is corrected on the basis of this correction signal $S_2$. And, in order to bring the slide position of the second press 3 to that of $P_2$, a main gear angular velocity command $I_{g2}$ after the correction is generated, being outputted to the driver 60. The driver 60 turns the main motor 61 in accordance with the main gear angular velocity command $I_{g2}$. When the slide motion of the second press is faster, the main motor 61 is decelerated, while, when the slide motion of the second press is slower, the main motor 61 is accelerated.

Then, as shown in FIG. 6, the waveform B' will be shifted back in the negative direction of the time base with respect to the waveform A, resulting in the relationship between the periodic change in the slide position of the first press 2 and the periodic change in the slide position of the second press 3 being turned into that between the waveform A and the waveform B with the value of phase difference being changed back into $T_1$.

The position sensor 95, 96 always detects the slide position coordinate $P_1$, $P_2$, and the second press control section 47 always determines the corresponding position coordinate $P_2$ that corresponds to the detected position $P_1$, computing the difference between the detected position $P_2$ and the corresponding position coordinate $P_{2'}$, i.e., $P_2$-$P_2$. Therefore, as the detected position $P_2$ deviates from the corresponding position coordinate $P_{2'}$, a correction signal $S_2$ is generated, the slide motion of the second press 3 is corrected in real time. Therefore, actually, the periodic change in the slide position of the first press 2 and the periodic change in the slide position of the second press 3 are held in the states of the waveform A and the waveform B, respectively, with the prescribed value of phase difference, $T_1$, being held.

Also between the second press 3 and the third press 4, the same control is performed, and also between the third press 4 and the fourth press 5, the same control is performed.

The above-described second mode of press control uses the position coordinate P for the slide as a based on which represents the slide position. Thus, the correspondence relationship between the displacement characteristic of the slide position of the press on the upstream side and the displacement characteristic of the slide position of the press on the downstream side is stored. However, the press angle (crank angle) may be used as a based on which represents the slide position, and the correspondence relationship between the change characteristic of the press angle of the press on the upstream side and the change characteristic of the press angle of the press on the downstream side may be stored.

The correspondence relationship between the values of a slide position representing based on, such as the slide position coordinate P or the press angle θ, for the respective presses may be stored as a table.

The second mode of press control is applicable to presses of any type, such as an electric servomotor type and a hydraulic servomotor type. However, for presses with no main gear, a command I other than a main gear angular velocity command $I_g$ is outputted, thus correction is performed for the command I.

As described above, the first or second mode of press control of the present embodiment is configured such that the press angle or slide position of the press on the downstream side is corrected on the basis of the press angle or slide position of the press on the upstream side in order to allow the slide of the press (the first press 2) on the upstream side and the slide of the press (the second press 3) on the downstream side to operate with a prescribed phase difference being maintained, thus even if the periodic operation of the press on the upstream side or the press on the downstream side has had a change, the slide position of the press on the downstream side is appropriately corrected to the slide position of the press on the upstream side. Therefore, continuous operation of a tandem press line is possible to be performed.

2. Control of Work Transportation Device

Figure 8:
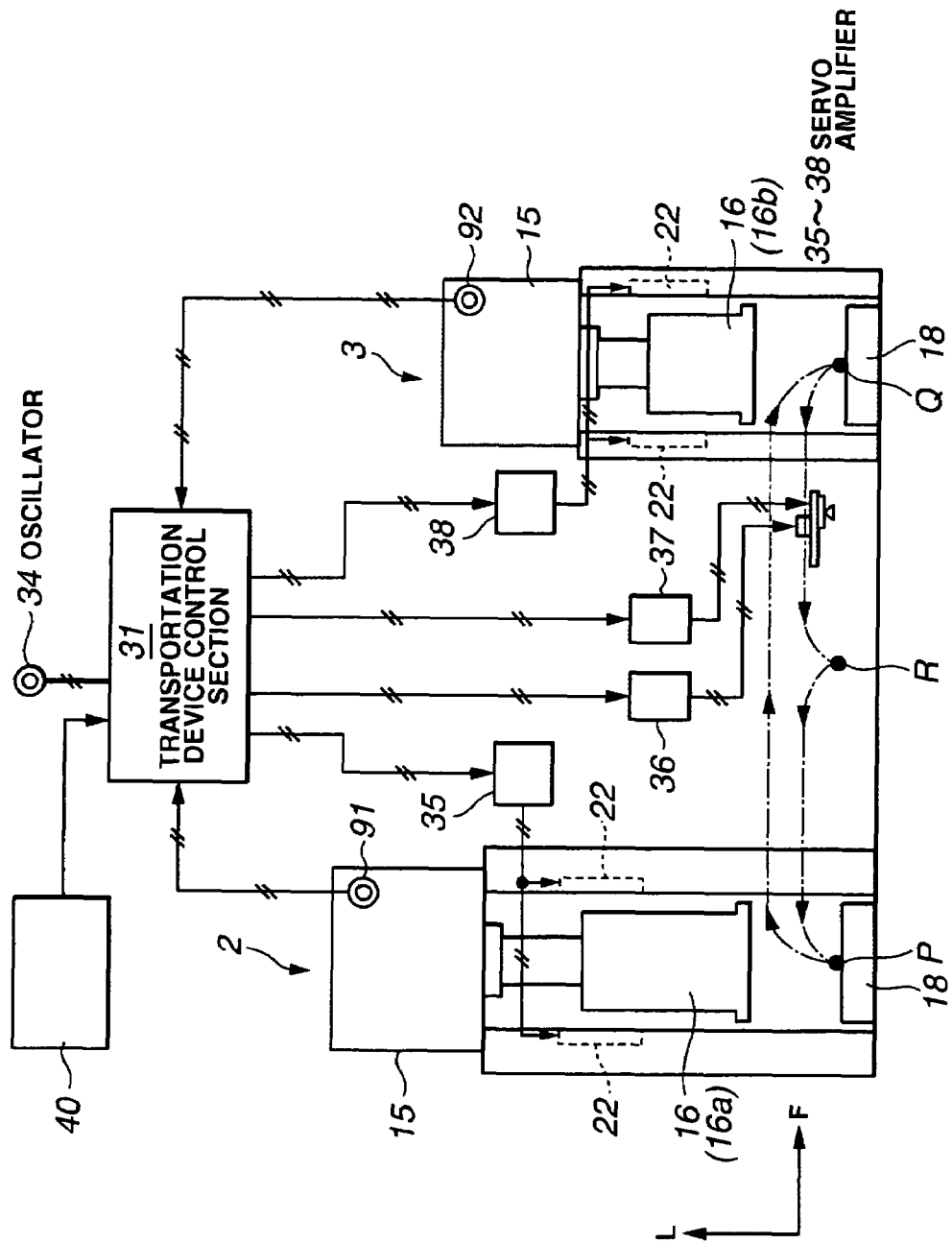
FIG. 8 is a configuration diagram for the control system related to control of the work transportation device.
Figure 9:
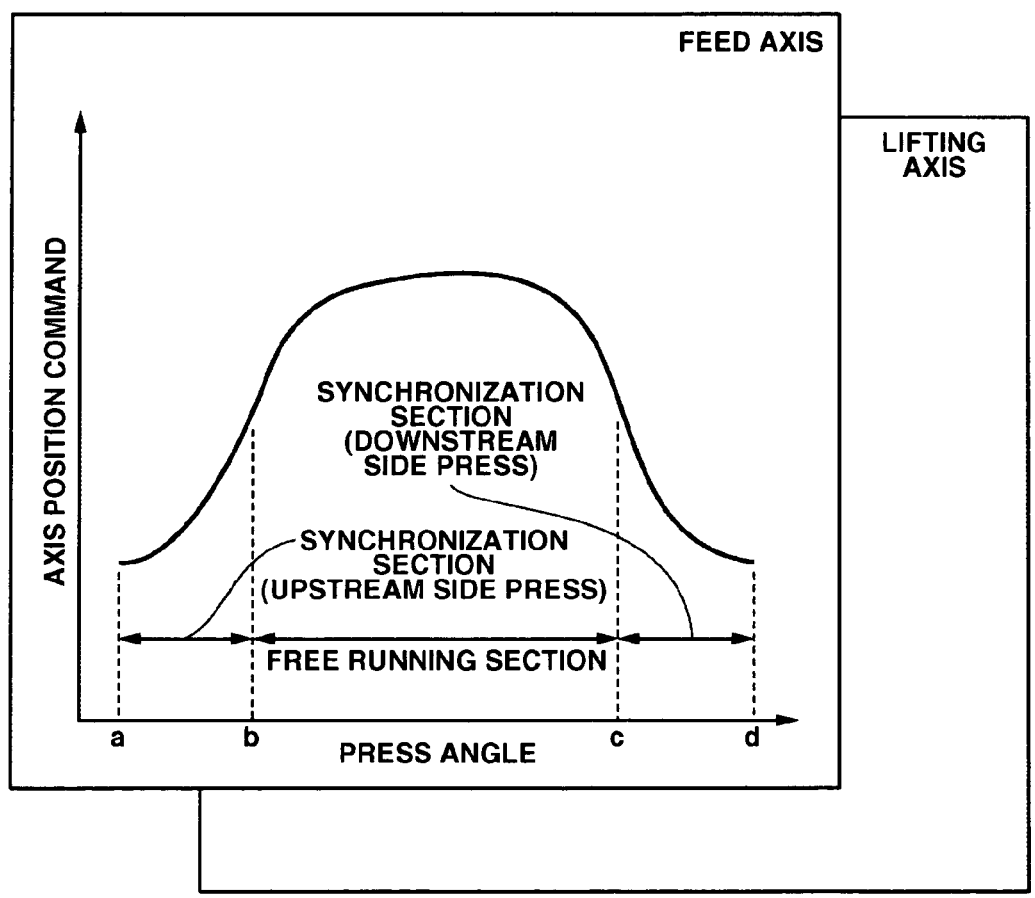
FIG. 9 is a diagram illustrating the feeder motion.

FIG. 8 is a configuration diagram for the control system related to control of the work transportation device. FIG. 9 is a diagram illustrating the feeder motion.

The vertically moving (lift-down) operation and the transporting (advance-return) operation of each work transportation device are performed by controlling the lifting axis servo motors 22 and the linear motors 24, 27 on the basis of the strokes and timings, i.e., the feeder motion previously established in the transportation device control section 31, as shown in FIG. 8 and FIG. 9, in order to avoid any interference of the work 8 transported by the work transportation device with the dies, and the like. In the present invention, the feeder motion provides two-dimensional motions in the feed axis direction (transporting direction) and the lifting axis direction (vertical direction), and is determined on the basis of the axis position command values for the press angles established for the respective axes (the feed axis and the lifting axis) as shown in FIG. 9. According to the feeder motion of the present embodiment, the work 8 is sucked at the suction point P from the inside of the lower die in the working station of the first press 2 on the upstream side to be lifted in the lifting axis (L) direction; then is transported in the feed axis (F) direction to above the lower die in the working station of the second press 3 on the downstream side; and then is lowered in the lifting axis direction to be placed inside this lower die, and released from the suction at the releasing point Q. Then, in order to return the work transportation device 10 to the working station of the first press 2, it is once lifted upward and moved in the return direction to the waiting point R, which is at a slightly lower level, and then is again raised and lowered to be returned to the suction point P, one cycle being completed.

The first press 2 on the upstream side and the second press 3 on the downstream side are provided with an encoder 91, 92, respectively, and by these encoders 91, 92, the press angle (crank angle) for the respective presses 2, 3 is detected, the detected value being inputted to the transportation device control section 31. Specifically, the encoder 91, 92 detects the pulse signals which number corresponds to the crank angle, and by the number of pulse signals detected being applied to an up-down counter in the transportation device control section 31, the number of pulse signals that corresponds to the crank angle is counted. The up-down counter is set such that the counted value is reset to the original value every time the crankshaft is turned one turn.

In addition, to the transportation device control section 31, basic pulse signals having a prescribed period are inputted from an oscillator 34, and by the inputted pulse signals being applied to the up-down counter in the transportation device control section 31, the number of pulse signals applied is counted. Like the encoder 91, 92, which is disposed in the respective presses 2, 3 on the upstream side and the downstream side, this oscillator 34 has a function to issue input signals to the transportation device control section 31 for controlling the vertically moving operation and the transporting operation of the work transportation device 10, and thus can be called an imaginary press angle detector (or an imaginary cam). The period of basic pulse signal for this oscillator 34 can be appropriately changed.

The transportation device control section 31 implements the necessary computation on the basis of the input information from the encoders 91, 92, and the oscillator 34, and on the result of the computation, issues command values to each servo amplifier (servo driver) 35, 36, 37, 38, thereby controlling the respective lifting axis servo motors 22 and linear motors 24, 27 in the work transportation device 10. The lifting axis servo motors 22 and linear motors 24, 27 are provided with a speed sensor (not shown) for detecting the speed of the motors, and by the detected speed signals from these speed sensors being inputted to the transportation device control section 31, the speed feedback is applied to the respective servo amplifiers 35 to 38.

Next, the controlling manner for the work transportation device 10 in the present embodiment will be described (the controlling manner is the same for the work transportation devices 9, 11, 12, 13).

First, in the prescribed press angle range "a" to "b" (see FIG. 9), where the slide 16a of the first press 2 on the upstream side passes the lower dead point and enters the rising course in transporting the work 8 from the first press 2, the transportation device control section 31 outputs a control signal to the respective servo amplifiers 35 to 38 on the basis of the signal from the encoder 91 provided for the first press 2. The work transportation device 10 performs the operation of vertically moving the lifting beam 19 and the operation of transporting the carriers 23 and the sub-carriers 26 in the feed direction in synchronism with (following) the motion of the first press 2 to move the vacuum cups 30 into the lower die in its working station for holding the work 8, and then carrying-out the work 8 from its lower die (the synchronization section with the press on the upstream side).

Next, in the section "b" to "c" (the free running section) from the point where the synchronization section is terminated, in other words, from the point where the work transportation device 10 gets out of the prescribed press angle range "a" to "b", to the point "c" where the next synchronization section with the second press 3 on the downstream side starts, the transportation device control section 31 outputs a control signal to the respective servo amplifiers 35 to 38 on the basis of the signal from the oscillator 34. More specifically, the free running section provides a preliminary section prior to the drive synchronized with the second press 3 on the downstream side, and in this section, the respective servo amplifiers 35 to 38 are controlled such that the deviation between the signal from the encoder 92 provided for the second press 3 on the downstream side and the signal from the oscillator 34 is gradually decreased. Thus, even if the respective presses 2, 3 on the upstream side and the downstream side are run at their own speeds, respectively, the running speed for the work transportation device 10 can be gradually matched to the running speed for the subsequent second press 3, thus the movement of the work transportation device can be more smoothly controlled, and the line speed can be improved. Further, even if the respective presses 2, 3 on the upstream side and the downstream side are operated, having a phase difference, respectively, the movement of the work transportation device can be adjusted in the preliminary section for accommodating the phase difference.

Thereafter, in the press angle range "c" to "d" following the free running section, the transportation device control section 31 outputs a control signal to the respective servo amplifiers 35 to 38 on the basis of the signal from the encoder 92 provided for the second press 3; the work transportation device 10 performs the operation of vertically moving the lifting beam 19 and the operation of transporting the carriers 23 and the sub-carriers 26 in the feed direction in synchronism with (following) the motion of the second press 3 to cause the vacuum cups 30 to carry-in the work 8 into the lower die in its working station (the synchronization section with the press on the downstream side).

Also for the return course after the work 8 having been carried in into the lower die of the second press 3 on the downstream side, such a control that the synchronization section with the second press 3 on the downstream side is followed by the synchronization section with the first press 2 on the upstream side through the free running section (including the waiting point R) is carried out in substantially the same manner as the above-mentioned transporting of the work 8 in the feed direction.

Thus, the work transportation control according to the present embodiment is configured such that, in carrying-in/out of the work into/from the press 2, 3 (the synchronization section), the work transportation device 10 is controlled for being synchronized with the motion of the slide 16 in the press 2, 3 on the basis of the press angle signal from the encoder 91, 92 provided for the press 2, 3, while, in the free running section following the termination of the work carrying-in/out operation, the work transportation device 10 is controlled on the basis of the signal from the oscillator (the imaginary press angle detector), thus even when the first press 2 on the upstream side and the second press 3 on the downstream side are operated independently of each other, the work transportation device 10 can be operated with no obstacle. Therefore, an excellent effect is provided in that the line speed for the tandem press line 1 can be greatly improved. In addition, an advantage that the work transportation control is not adversely affected by such a disturbance as a vibration in press forming of the work 8.

Next, the positional relationship between the adjacent presses and the work transportation device that is changed with the elapsed time will be described.

Figure 10:
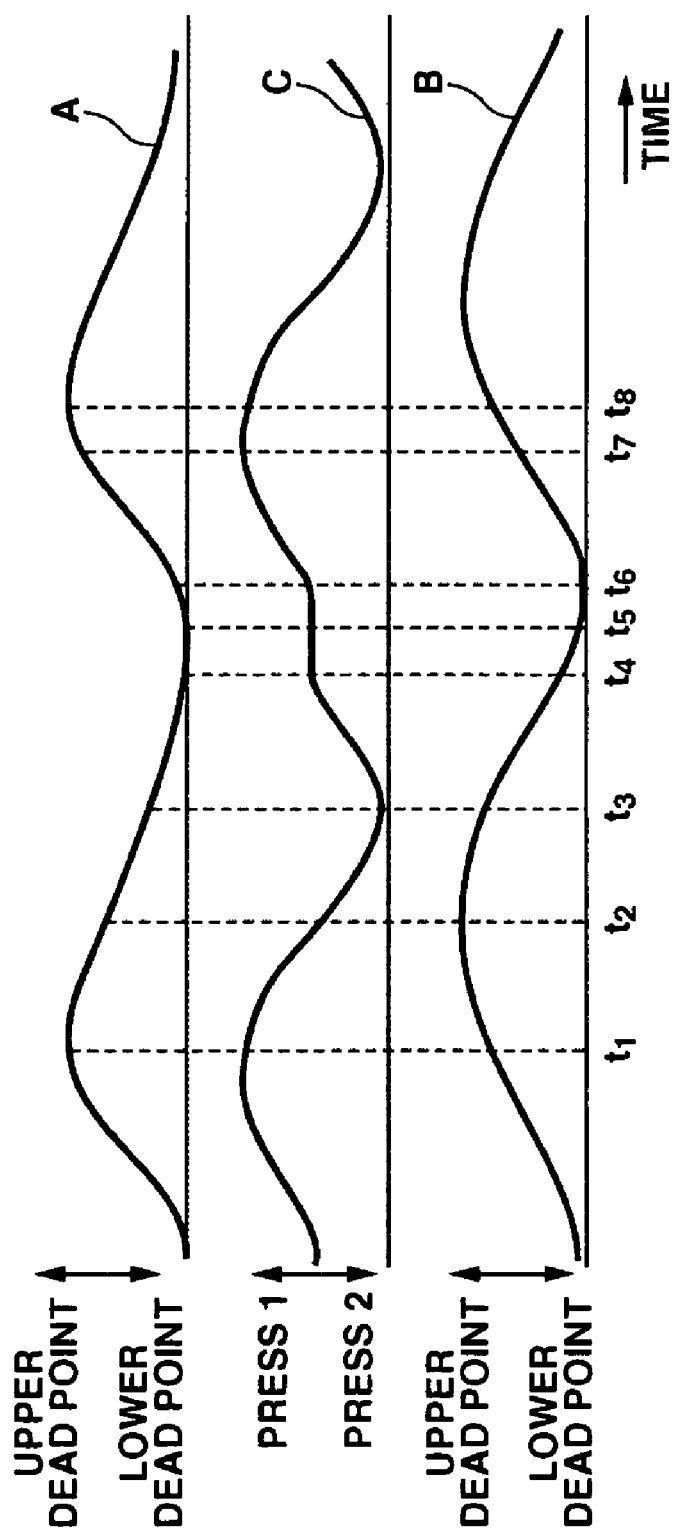
FIG. 10 is a diagram illustrating the slide positions of the adjacent presses, and the position of the work transportation device versus the elapsed time.

FIG. 10 is a diagram illustrating the slide positions of the adjacent presses, and the position of the work transportation device versus the elapsed time. The waveform A depicts the periodic change in the slide position of the first press 2; the waveform B depicts the periodic change in the slide position of the second press 3; and the waveform C depicts the periodic change in the position of the work transportation device 10. The top of the waveform A, B represents the upper dead point for the slide, while the bottom thereof represents the lower dead point for the slide. The top of the waveform C represents the working station of the first press 2, while the bottom represents the working station of the second press 3. Hereinbelow, by referencing to the operation in one stroke of the slide 16a of the first press 2, the operation of the slide 16b of the second press 3 and the operation of the work transportation device 10 will be described.

At time $t_1$, the slide 16a of the first press 2 reaches the upper dead point. At this time, the slide 16b of the second press 3 is in the course of rising, while the work transportation device 10 is in the course of transporting the work to the second press 3 after having carried out it from the working station of the first press 2.

At time $t_2$, the slide 16b of the second press 3 reaches the upper dead point. At this time, the slide 16a of the first press 2 is in the course of lowering, while the work transportation device 10 is in the course of transporting the work to the second press 3.

At time $t_3$, the work transportation device 10 carries in the work into the working station of the second press 3. At this time, the slide 16a of the first press 2 and the slide 16b of the second press 3 are in the course of lowering, the slide 16b of the second press 3 being in the vicinity of the upper dead point.

At time $t_4$, the work transportation device 10 starts to wait at the waiting point. At this time, the slide 16a of the first press 2 and the slide 16b of the second press 3 are in the course of lowering.

At time $t_5$, the slide 16a of the first press 2 reaches the lower dead point. At this time, the slide 16b of the second press 3 is in the course of lowering, while the work transportation device 10 is in the waiting state.

At time $t_6$, the slide 16b of the second press 3 reaches the lower dead point. At this time, the slide 16a of the first press 2 is in the course of rising, while the work transportation device 10 starts to move back toward the first press 2.

At time $t_7$, the work transportation device 10 carries out the work from the working station of the first press 2. At this time, the slide 16a of the first press 2 and the slide 16b of the second press 3 are in the course of rising, the slide 16a of the first press 2 being in the vicinity of the upper dead point.

At time $t_8$, the slide 16a of the first press 2 again reaches the upper dead point.

According to the present embodiment, the slide motion of the press on the downstream side is corrected in real time to the slide motion of the press on the upstream side, and the work carrying-in/transporting/carrying-out operation by the work transportation device is performed to the slide motions of the adjacent presses, thus the tandem press line can be continuously operated, resulting in the production efficiency being greatly improved. The ability to provide continuous operation eliminates the need for clutch engagement and release, and brake application, which has been required for intermittent operation, thus the wear of the facings provided for the clutch and the brake can be reduced. Therefore, the maintenance cost and the maintenance frequency can be reduced. In addition, with the elimination of the need for intermittent operation, the noise resulting from the engagement and release of the clutch and the application of the brake can be eliminated.

Further, according to the present embodiment, when the operation of the work transportation device is to be synchronized with the operation of the press apparatus on the downstream side, the operation of the work transportation device can be more smoothly controlled, which allows more efficient press forming to be realized.

INDUSTRIAL APPLICABILITY

The present invention is applicable to any tandem press line which comprises a plurality of press apparatuses and a work transportation device disposed between adjacent press apparatuses.

The invention claimed is:

1. An operation control method for a tandem press line in which a work transportation device is disposed between a press apparatus on an upstream side and a press apparatus on a downstream side which are adjacent to each other, the method comprising:
   controlling operation of the press apparatus on the downstream side based on a signal in accordance with operation of the press apparatus on the upstream side;
   controlling operation of the work transportation device in a work carrying-out section in a vicinity of the press apparatus on the upstream side based on a signal according to the operation of the press apparatus on the upstream side;

controlling operation of the work transportation device in a work carrying-in section in a vicinity of the press apparatus on the downstream side based on a signal according to the operation of the press apparatus on the downstream side;

controlling operation of the work transportation device in a work transporting section between the work carrying-out section and the work carrying-in section based on a signal generated by an oscillator of the work transportation device; and controlling the signal generated by the oscillator so as to gradually decrease a deviation between the signal generated by the oscillator and the signal according to the operation of the press apparatus on the downstream side.

2. The operation control method for a tandem press line according to claim 1, further comprising:

storing predetermined indication values representing a slide position of the press apparatus on the downstream side in association with a slide position of the press apparatus on the upstream side;

detecting indication values representing a slide position of the press apparatus on the downstream side and a slide position of the press apparatus on the upstream side;

determining a corresponding indication value for the press apparatus on the downstream side on the basis of the detected indication value of the press apparatus on the upstream side; and controlling the operation of the press apparatus on the downstream side such that the detected indication value for the press apparatus on the downstream side is identical to the determined corresponding indication value for the press apparatus on the downstream side.

3. The operation control method for a tandem press line according to claim 1, wherein each press apparatus is continuously operated.

4. The operation control method for a tandem press line according to claim 1, further comprising:

controlling a speed of a motor provided for the press apparatus on the downstream side when the operation of the press apparatus on the downstream side is controlled.

5. A tandem press line in which a work transportation device is disposed between a press apparatus on an upstream side and a press apparatus on a downstream side which are adjacent to each other, comprising:

a press controlling section operable to control operation of the press apparatus on the downstream side on the basis of a signal in accordance with operation of the press apparatus on the upstream side; and a work transporting control section operable to control operation of the work transportation device in a work carrying-out section in a vicinity of the press apparatus on the upstream side on the basis of a signal in accordance with the operation of the press apparatus on the upstream side, the work transporting control section being further operable to control operation of the work transportation device in a work carrying-in section in a vicinity of the press apparatus on the downstream side on the basis of a signal in accordance with the operation of the press apparatus on the downstream side, the work transporting control section being further operable to control operation of the work transportation device in a transporting section between the work carrying-out section and the work-carrying-in section on the basis of a signal generated by an oscillator of the work transportation device, the work transporting control section being further operable to control the signal generated by the oscillator so as to gradually decrease a deviation between the signal generated by the oscillator and the signal according to the operation of the press apparatus on the downstream side.

6. The tandem press line according to claim 5, further comprising a press control section operable to store predetermined indication values representing a slide position of the press apparatus on the downstream side in association with a slide position of the press apparatus on the upstream side, wherein the press control section is operable to detect indication values representing a slide position of the press apparatus on the downstream side and a slide position of the press apparatus on the upstream side, the press control section is operable to determine a corresponding indication value for the press apparatus on the downstream side on the basis of the detected indication value for the press apparatus on the upstream side, and the press control section is further operable to control the operation of the press apparatus on the downstream side such that the detected indication value for the press apparatus on the downstream side is identical to the determined corresponding indication value for the press apparatus on the downstream side.

7. The tandem press line according to claim 5, wherein each of the press apparatuses is continuously operated.

8. The tandem press line according to claim 5, wherein the press control section is further operable to control a speed of a motor provided for the press apparatus on the downstream side.

9. A work transportation device for a tandem press line comprising a work transfer section disposed between a press apparatus on an upstream side and a press apparatus on a downstream side which are adjacent to each other among a plurality of press apparatuses, and a control section operable to control operation of the work transfer section, wherein the control section is operable to control operation of the work transportation device in a work carrying-out section in a vicinity of the press apparatus on the upstream side on the basis of a signal in accordance with operation of the press apparatus on the upstream side, the control section is operable to control the operation of the work transportation device in a work carrying-in section in a vicinity of the press apparatus on the downstream side on the basis of a signal in accordance with operation of the press apparatus on the downstream side, the control section is operable to control the operation of the work transportation device in the work transfer section on the basis of a signal generated by an oscillator of the work transportation device, the work transfer section being between the work carrying-out section and the work carrying-in section, and the control section is operable to control the signal generated by the oscillator so as to gradually decrease a deviation between the signal generated by the oscillator and the signal according to the operation of the press apparatus on the downstream side.

* * * * *